United States Patent
Tsai

(10) Patent No.: US 9,430,691 B2
(45) Date of Patent: Aug. 30, 2016

(54) FINGERPRINT READING SYSTEM

(71) Applicant: LUSTROUS ELECTRO-OPTIC CO.,LTD., New Taipei (TW)

(72) Inventor: Chih-Wei Tsai, Hsinchu (TW)

(73) Assignee: LUSTROUS ELECTRO-OPTIC CO., LTD., New Taipei (TW)

( * ) Notice: Subject to any disclaimer, the term of this patent is extended or adjusted under 35 U.S.C. 154(b) by 0 days.

(21) Appl. No.: 14/572,833

(22) Filed: Dec. 17, 2014

(65) Prior Publication Data
US 2015/0169934 A1 Jun. 18, 2015

(30) Foreign Application Priority Data
Dec. 18, 2013 (TW) .............................. 102146990 A

(51) Int. Cl.
G06K 9/62 (2006.01)
G06K 9/00 (2006.01)

(52) U.S. Cl.
CPC ................................ G06K 9/00033 (2013.01)

(58) Field of Classification Search
None
See application file for complete search history.

(56) References Cited

U.S. PATENT DOCUMENTS

| | | | |
|---|---|---|---|
| 9,134,464 B2* | 9/2015 | Feng | G02B 3/14 |
| 2012/0086794 A1* | 4/2012 | Burcham | G06K 9/036 |
| | | | 348/77 |

* cited by examiner

*Primary Examiner* — Brian P Werner
(74) *Attorney, Agent, or Firm* — Li & Cai Intellectual Property (USA) Office

(57) ABSTRACT

A fingerprint reading system includes a camera module, a control module, and a signal processing module. The camera module has a detection unit, an image capture unit, a liquid lens unit, and an illumination unit. Control module is electrically connected to camera module for controlling the internal components of camera module. When the detection unit detects a start signal, the control module activates the image capture unit, liquid lens unit, and illumination unit. The liquid lens unit adjusts the focus distance across an entire scanning region and scans fingerprint. The image capture unit adjusts the focus distance across the entire scanning region through the liquid lens unit and scans fingerprint to capture multiple photos. The signal processing module selects the sharpest photo from the multiple photos to convert to a fingerprint image.

6 Claims, 4 Drawing Sheets

FINGERPRINT READING SYSTEM

BACKGROUND OF THE INVENTION

1. Field of the Invention

The instant disclosure relates to a fingerprint reading system; in particular, to a non-contact fingerprint reading system.

2. Description of Related Art

Personal electronic devices such as laptops or mobile phones typically retain user's personal information. To prevent others from obtaining personal information, access password is usually pre-set by the user to gain access to the personal electronic devices. However, access password can still be bypassed easily by other manners, thus allowing others to obtain personal information.

Contact optical fingerprint readers are available that provide bright and dark fingerprint images because of full reflection of light onto the surface of a prism is intercepted by the ridge on a finger. However, the bulk volume and cost of the prism in the contact optical fingerprint reader are quite high, and the surface of the prism requires surface treatment to prevent scratches and corrosive damages while fingers can easily leave dirt on the surface of the prism that requires cleaning, all of which prevent the readers from accurate authentication. Moreover, the contact type readers cannot identify real fingerprints from synthetic fingerprint.

Although non-contact fingerprint readers typically are also available, conventional non-contact fingerprint readers typically include micro lenses to obtain high resolution fingerprint images and require close enough distance to the finger in order to provide sufficient magnification and clear fingerprint images. Not only is the depth of field shallow, but finger support mechanism is also required to fix the finger's position. Alternatively, an expensive and high-end macro lens is required to provide deep depth of field effects in close proximity.

To address the above issues, the inventor strives via associated experience and research to present the instant disclosure, which can effectively improve the limitation described above.

SUMMARY OF THE INVENTION

An objective of the instant disclosure is to provide a non-contact fingerprint reading system that prevents the problems conventional arts encounter. In order to achieve the aforementioned objectives, a fingerprint reading system according to an embodiment of the instant disclosure is provided. The fingerprint reading system comprises a camera module, a control module, and a signal processing module. The camera module has a detection unit, an image capture unit, a liquid lens unit, and an illumination unit. The control module is electrically connected to the camera module to control the image capture unit, the liquid lens unit, and the illumination unit. When the detection unit detects a start signal (the existence of a finger in detected range), the control module initiates the image capture unit, the liquid lens unit, and the illumination unit. In order to scan, the liquid lens unit adjusts the focus distance across an entire scanning region (from far to near or near to far). The image capture unit captures a plurality of subsequent images of fingerprints as the liquid lens unit adjusts the focus distance to scans fingerprints across the entire scanning region (from far to near or near to far). The signal processing module selects one high quality or the sharpest fingerprint image from the plurality of images captured by the image capture unit and converts the high quality or the sharpest image as a standard fingerprint file.

Another embodiment of the instant disclosure provides a fingerprint reading method comprises the steps of detecting whether an object is in a scanning region, determining properties of the object, initiating an illumination unit, initiating an image capture unit and a liquid lens unit, adjusting focus distance of the image capture unit by the liquid lens unit within the scanning region (from far to near or near to far) to scan, capturing a plurality of subsequent images within the scanning region (from far to near or near to far), deactivating the image capture unit, the liquid lens unit, and the illumination unit, selecting an high quality or the sharpest fingerprint image from the plurality of subsequent images captured by the image capture unit, and converting the high quality or sharpest fingerprint image as a standard fingerprint file.

Another embodiment of the instant disclosure provides a fingerprint reading method comprises the steps of detecting whether an object is in a scanning region, determining properties of the object, initiating an illumination unit, initiating an image capture unit and a liquid lens unit, adjusting focus distance of the image capture unit by the liquid lens unit within the scanning region (from far to near or near to far) to scan, capturing a plurality of subsequent images, deactivating the image capture unit, the liquid lens unit, and the illumination unit, selecting a high quality or sharpest fingerprint image from the plurality of subsequent images captured by the image capture unit, and converting the high quality or the sharpest fingerprint image as a standard fingerprint file.

The instant disclosure provides the following improvements. With the assembled camera module, control module, and signal processing module, the fingerprint reading system and method include automatic activation mechanisms and can eliminate identification errors from moving fingers.

In order to further understand the instant disclosure, the following embodiments and illustrations are provided. However, the detailed description and drawings are merely illustrative of the disclosure, rather than limiting the scope being defined by the appended claims and equivalents thereof.

DETAILED DESCRIPTION OF THE PREFERRED EMBODIMENTS

The aforementioned illustrations and detailed descriptions are exemplarities for the purpose of further explaining the scope of the instant disclosure. Other objectives and advantages related to the instant disclosure will be illustrated in the subsequent descriptions and appended drawings.

[First Embodiment]

Figure 1:
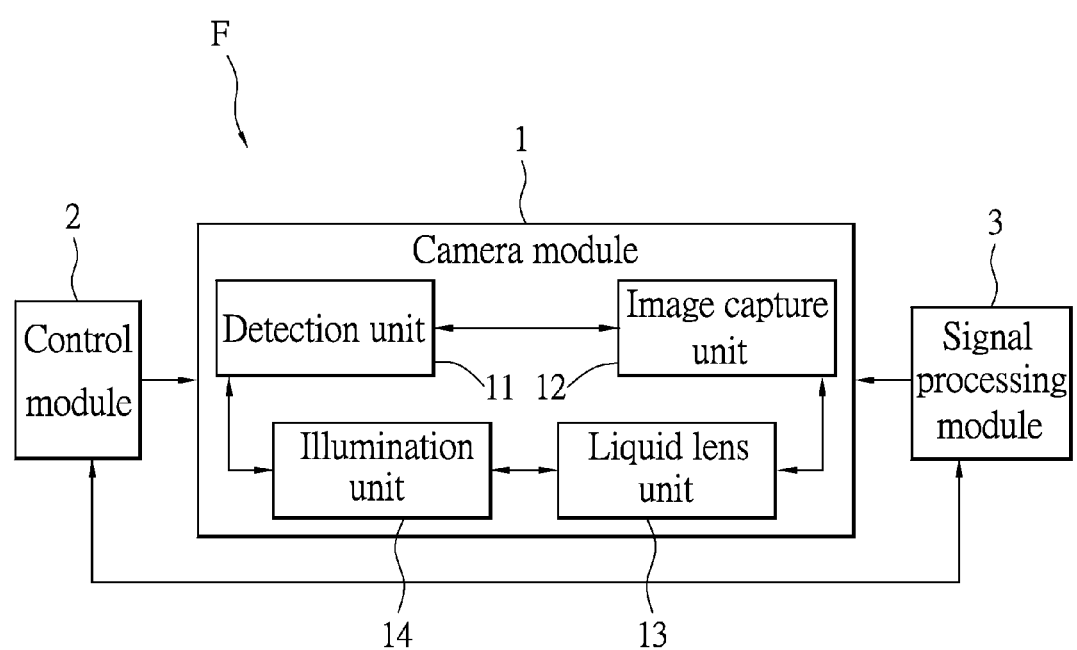
FIG. 1 is a block diagram of a fingerprint reading system in accordance with a first embodiment of the instant disclosure.

Please refer to FIG. 1. The first embodiment provides a fingerprint reading system F that includes a camera module 1, a control module 2, and a signal processing module 3. The camera module 1, control module 2, and signal processing module 3 are electrically connected to one another.

As shown in FIG. 1, the camera module 1 has a detection unit 11, an image capture unit 12, a liquid lens unit 13, and an illumination unit 14. The control module 2 controls the image capture unit 12, liquid lens unit 13, and the illumination unit 14. When the detection unit 11 detects a start signal, the control module 2 initiates or activates the image capture unit 12, the liquid lens unit 13, and the illumination unit 14. The start signal can be defined as the shape of the finger, color of the finger, or even a pre-determined area that is occupied by the finger that is accurately detected by the detection unit 11. For example, a finger occupies a half or one-third of the total area of the image captured by the capture unit 12, or location of the finger can be detected by active detection elements such as the typical infrared scanner, supersonic detectors, or even radar, but are not limited to the examples provided herein. With the detection unit 11, the fingerprint reading system F has automatic activating mechanism.

After the image capture unit 12, liquid lens unit 13, and the illumination unit 14 are initiated or activated, the illumination unit 14 sheds light on the finger so that a significant brightness contrast exists between the fingerprint and the background. The light source of the illumination unit 14 can be white light, infrared, and other monochromic lights.

Meanwhile, the liquid lens unit 13 adjusts the focus distance and scans the fingerprint across an entire scanning region (from far to near or near to far). The image capture unit 12 captures a plurality of images as the liquid lens unit adjusts the focus distance across the entire scanning region (from far to near or near to far), and transmits those images to the signal processing module 3. Please refer to FIG. 2 as the schematic diagram illustrating the image scanning principle, where the shorter vertical line represents the surface which is focused on whereas the horizontal lines above represent the depth of field. Typically, the closer the distance between the focused surface and the image capture unit 12, the more shallow the depth of field. To resolve this problem of close-up focusing, users are not required to position fingers in a designated spot. The liquid lens unit 13 of the instant disclosure applies a surface focus scanning mechanism to capture subsequent images of various focus distances, so that the subsequently captured images cover the entire preset image capturing distance with the appropriately adjusted liquid lens unit 13.

Figure 2:
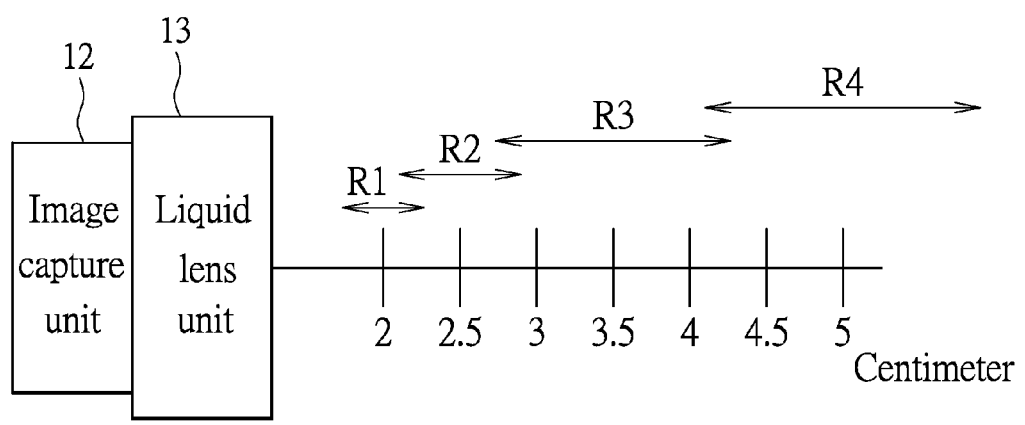
FIG. 2 is a schematic diagram illustrating fingerprint focusing and scanning principle of the fingerprint reading system in accordance with the instant disclosure.

The depth of field R1 in FIG. 2 represents a focus distance of 2 centimeters, another depth of field R2 represents a focus distance of 2.5 cm, yet another depth of field R3 represents a focus distance of 3.5 cm, and another depth of field R4 represents a focus distance of 5 cm. The liquid lens unit 13 adjusts the focus distance across the entire scanning region (from far to near or near to far) in order to scan fingerprints from a distance between 1 to 10 cm, with a preferable scanning range spanning from 2 to 5 cm, and a scanning time of 0.5 seconds, with a preferable scanning time of 0.3 seconds. The image capture unit 12 captures three to ten fingerprint images, preferably 4 to 6 images, through the liquid lens unit 13, and transmits a plurality of images to the signal processing module 3. Within a plurality of images, one of which will mostly likely retain high quality or the sharpest image quality. Since the liquid lens unit 13 can rapidly change focus distance within a short period of time (at the level of less than 10 millisecond), the time to completely scan the total distance takes no more than 0.5 seconds, so that image blurring due to moving fingers can be eliminated. The fingerprint reading system of the instant disclosure can loosened the strict standards of finger positioning to within 1 to 10 cm, which expands the freedom of user's finger positioning Successively, the signal processing module 3 selects one high quality or the sharpest fingerprint image of the finger from a plurality of images that covers the entire scanning region and is captured by the image capturing unit 12, and applies image processing to that high quality or the sharpest fingerprint image. The processing includes first defining the finger's positioned area, removing the background besides the fingerprint, amplify contrast, removing unwanted noises, and converting the format of the image to a standardized fingerprint file in order to transmit the image to a fingerprint recognition software for matching purposes. The signal processing module 3 can be a computer that executes image analysis and image processing. Moreover, the signal processing module 3 and the control module 2 can be embedded systems, which have similar function as a computer and can complete tasks regarding fingerprinting analysis.

The first embodiment of the fingerprint reading system F in accordance with the instant disclosure can first determine whether the finger is within the detection area of the fingerprint reading system F, and then determine whether or not to activate the illumination unit 14. As such, users can be obviated from the overly blinding lights generated from the illumination unit 14 that is accidentally activated by fingers not yet in the detection area of the fingerprint reading system F. When the start signal is not detected by the fingerprint reading system F, the camera module 1 can serve as a typical camera, a close up facial camera or a video camera.

[Second Embodiment]

Figure 3:
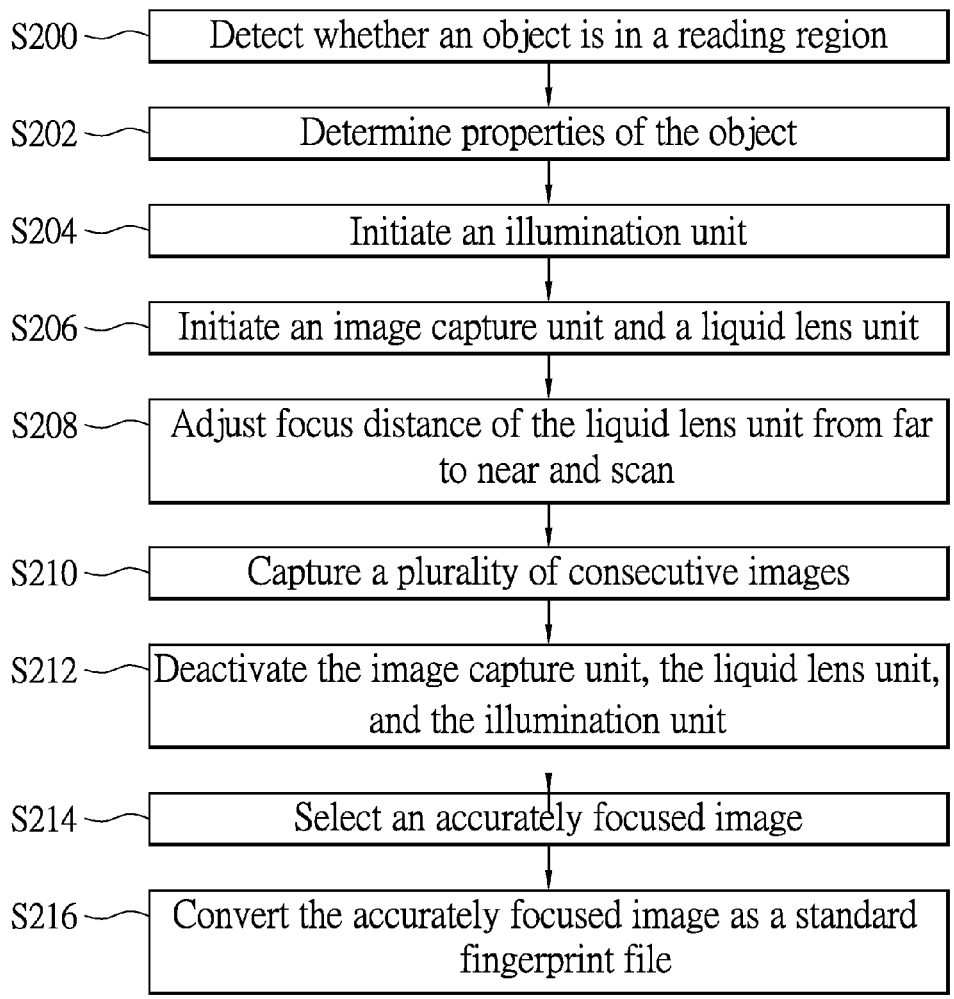
FIG. 3 is a block flow diagram of a fingerprint reading method in accordance with a second embodiment of the instant disclosure.

Please refer to FIG. 3. The second embodiment of the instant disclosure provides a method F200 for reading fingerprints that includes the following steps. An object is detected to determine whether the object is placed within the scanning region in step S200. The object can be detected by an active detection unit such as an infrared scanner, ultrasonic detector or even radar. Then as shown in step S202, properties of the object are determined in order to confirm whether or not the object is a finger. Properties can be the shape of the finger, the color of the finger, or the pre-determined area that the finger occupies in order to confirm authenticity of the fingerprint. For example, a third or one half of an image captured by the image capture unit 12 can first be analyzed and then the color or the shape of the finger is analyzed to confirm authenticity.

As shown in step S204, the illumination unit 14 is initiated or activated once the object is determined to be a finger. Illuminating light rays are then focused onto the fingerprint. With the illumination unit 14 illuminating the finger, the brightness contrasts between the fingerprint and the background can be intensified. The illumination unit 14, for example, can be white light, infrared, or other monochromatic light source. Proceeding to steps S206, S208, and S210, the image capture unit 12 and the liquid lens unit 13 are initiated or activated. The liquid lens unit 13 adjusts focus across the entire scanning region (from far to near or near to far) in order to scan the fingerprint. The image capture 12 captures a plurality of subsequent images of the fingerprint as the liquid lens unit 13 adjusts focus across the entire scanning region (from far to near or near to far) in order to scan the fingerprint, and the image capture 12 transmits the images to the signal processing unit 3. For example, the liquid lens unit 13 adjusts focus across the entire scanning region (from far to near or near to far) in order to scan fingerprint at a distance ranges between 10 cm to 1 cm, in which a preferable scanning range spans from 2 to 5 cm, and a scanning time of 0.5 seconds, in which a preferable scanning time is 0.3 seconds. The image capture unit 12 captures 3 to 10 images, preferably 4 to 6 images, of the fingerprint through the liquid lens unit 13, and transmits the captured images of the fingerprint to the signal processing unit 3. Among the multiple images captured, one of which has the highest quality or the sharpest fingerprint image, and since the liquid lens unit 13 can rapidly change focus distance within a short period of time (less than 10 ms or similar class), the time in order to go over the entire scanning distance is no longer than 0.5 seconds so that image blurring due to moving fingers is eliminated.

As shown in steps S212 and S214, the image capture unit, liquid lens unit, and illumination unit are deactivated after images are captured. Successively, a high quality or the sharpest fingerprint image is selected among the multiple of images captured and processed via the signal processing unit 3. The positioning area of the finger relative to the image is determined, then background portions of the image besides the finger are removed, contrast is amplified, negative processing, noise removal, and relevant tasks are performed. Then as shown in step S216, the high quality or the sharpest fingerprint image is formatted as the standard fingerprint file and is transmitted to the fingerprint recognition software for fingerprint comparison.

The fingerprint reading method F200 in the second embodiment of the instant disclosure can first determine whether the object is in the scanning region, determine whether the object is a finger, and then activate the illumination unit 14, so that the illumination unit 14 is not activated before the finger is placed in the scanning region and unnecessary glare that affects user may be prevented. When the start signal is not detected, the camera module can be a typical camera, a close up facial camera or a video camera.

[Third Embodiment]

Figure 4:
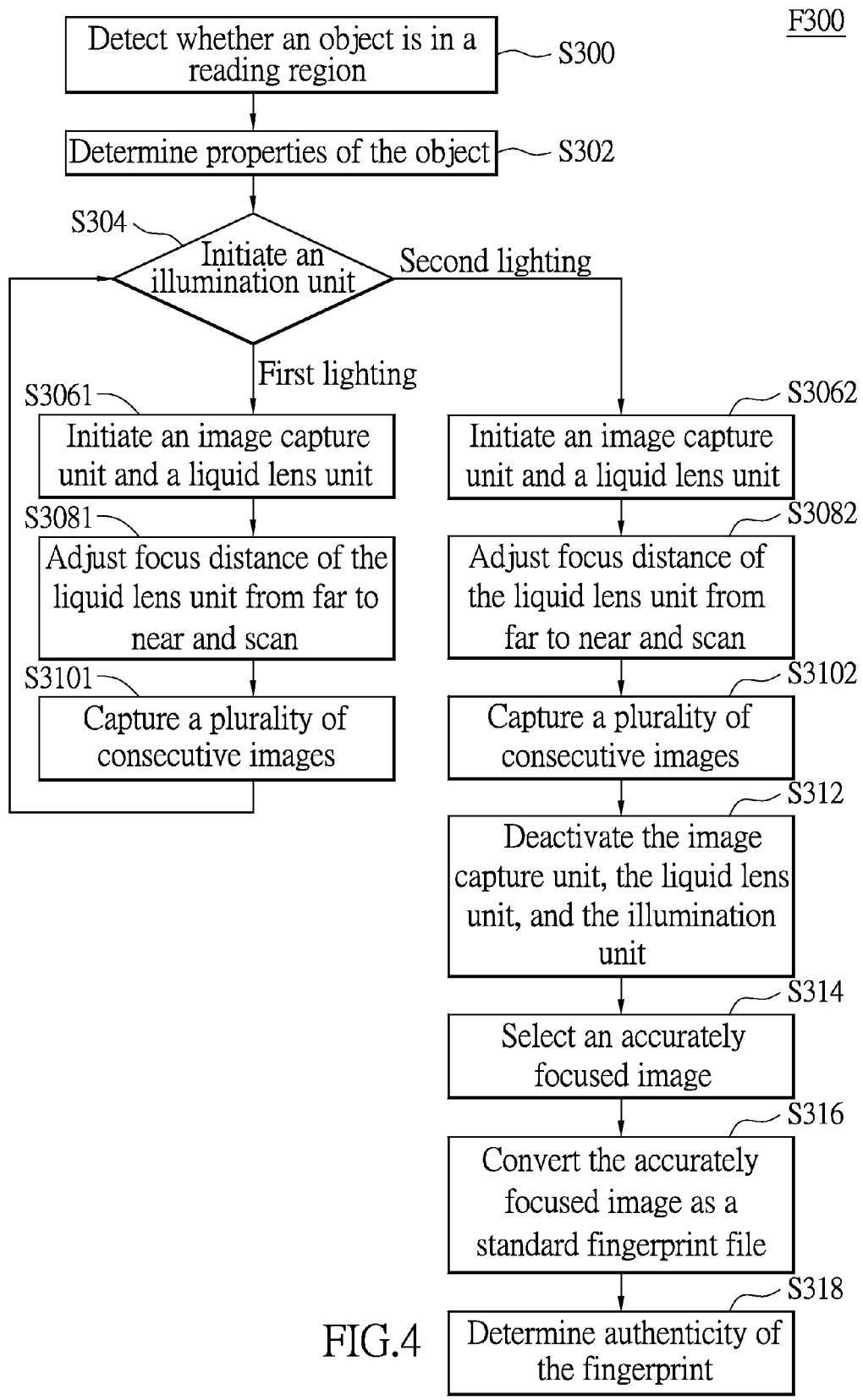
FIG. 4 is another block flow diagram of the fingerprint reading method in accordance with a third embodiment of the instant disclosure

As shown in FIG. 4, a fingerprint reading method F300 is provided in a third embodiment of the instant disclosure. The third embodiment mainly differs from the second in that the illumination unit 14 irradiates different light rays onto the finger, in which different light rays have different effects on the finger, and the signal processing module 3 determines the authenticity of the fingerprint.

As shown in step S300, an object is detected to determine whether the object is placed within the scanning region. The object can be detected by an active detection unit such as an infrared scanner, ultrasonic detector or even radar. Then as shown in step S302, properties of the object are determined in order to confirm whether or not the object is a finger. Properties can be the shape of the finger, the color of the finger, or the pre-determined area that the finger occupies in order to confirm authenticity of the fingerprint. For example, a third or one half of an image captured by the image capture unit 12 can first be analyzed and then the color or the shape of the finger is analyzed to confirm authenticity.

As shown in step S304, the illumination unit 14 is initiated or activated once the object is determined to be a finger. Illuminating light rays are then focused onto the fingerprint. With the illumination unit 14 illuminating the finger, the brightness contrast between the fingerprint and the background can be intensified. The illumination unit 14, for example, can be white light, infrared, or other monochromatic light source. In order to determine the authenticity of the finger, a first lighting of white light is irradiated by the illumination unit on the finger so that the fingerprint is under a white light environment.

Proceeding to steps S3061, S3081, and S3101, the image capture unit 12 and the liquid lens unit 13 are initiated or activated. The liquid lens unit 13 adjusts focus across the entire scanning region (from far to near or near to far) in order to scan the fingerprint. The image capture 12 captures a plurality of subsequent images of the fingerprint as the liquid lens unit 13 adjusts focus across the entire scanning region (from far to near or near to far) in order to scan the fingerprint and the image capture 12 transmits the images to the signal processing unit 3. For example, the liquid lens unit 13 adjusts focus across the entire scanning region (from far to near or near to far) in order to scan fingerprint at a distance ranges between 10 cm to 1 cm, in which a preferable scanning range spans from 2 to 5 cm, and a scanning time of 0.5 seconds, in which a preferable scanning time is 0.3 seconds. The image capture unit 12 captures 3 to 10 images, preferably 4 to 6 images, of the fingerprint through the liquid lens unit 13, and transmits the captured images of the fingerprint to the signal processing unit 3.

Proceeding to steps S3062, S3082, and S3102, after the image that was first irradiated by the first lighting of white light is transmitted to the signal processing unit 3, a second lighting of red light, infrared or similar light, or other monochromatic light is irradiated by the illumination unit on the finger while the liquid lens unit 13 adjusts focus across the entire scanning region (from far to near or near to far) and scans the fingerprint on the finger. The image capture unit 12 captures a plurality of subsequent images of the fingerprint as the liquid lens unit 13 adjusts focus across the entire scanning region (from far to near or near to far) in order to scan the fingerprint, and the image capture 12 transmits the images to the signal processing unit 3. Then the image capture unit 12, liquid lens unit 13, and illumination unit 14 are deactivated.

Successively as shown in step S314, a high quality or the sharpest fingerprint image selected among the multiple of images captured under the first lighting and another high quality or the sharpest fingerprint image selected among the multiple of images captured under second lighting are processed by the signal processing unit 3. The positioning are of the finger relative to the images is determined, then background portions of the image besides the finger are removed, contrast is amplified, negative processing, noise removal, and relevant tasks are performed. Then as shown in steps S316 and S318, the high quality or the sharpest fingerprint images from the first lighting and the second lighting are formatted as the standard fingerprint files and are transmitted to the fingerprint recognition software for fingerprint matching and fingerprint authentication.

The fingerprint reading method F300 in the third embodiment of the instant disclosure can first determine whether the object in the scanning region, determine whether the object is a finger, and then activate the illumination unit 14, so that the illumination unit 14 is not activated before the finger is placed in the scanning region and unnecessary glare that affects user may be prevented. The accuracy of the authentication process is further improved by comparing the images captured by the image capture unit 14 under different light sources in the first lighting and second lighting and then determining the authenticity of the fingerprint. When the start signal is not detected, the camera module can be a typical camera, a close up facial camera or a video camera.

The figures and descriptions supra set forth illustrate the preferred embodiments of the instant disclosure; however, the characteristics of the instant disclosure are by no means restricted thereto. All changes, alterations, combinations or modifications conveniently considered by those skilled in the art are deemed to be encompassed within the scope of the instant disclosure delineated by the following claims.

What is claimed is:

1. A fingerprint reading method, comprising the steps of:
   detecting whether an object is in a scanning region;
   initiating an illumination unit;
   initiating an image capture unit and a liquid lens unit;
   adjusting focus distance of the image capture unit by the liquid lens unit across an entire scanning region from far to near or from near to far and scanning;
   capturing a plurality of subsequent images across the entire scanning region;
   a fingerprint image with the highest quality from the plurality of subsequent images captured by the image capture unit; and
   converting the highest quality fingerprint image as a standard fingerprint file;
   wherein in the step of initiating the illumination unit further comprising:
   applying a first lighting with a white light as the illumination unit before initiating the image capture unit and liquid lens unit to focus across the entire scanning region and capturing a plurality of subsequent images;
   applying a second lighting with a monochromic light, such as a red light or near infrared light, as the illumination unit, initiating the image capture unit and liquid lens unit, and converting the highest quality fingerprint image from the plurality of subsequent images captured; and
   analyzing an image file captured by the first lighting and a separate image file captured by the second lighting with a signal processing module.

2. The fingerprint reading method as recited in claim 1, wherein the liquid lens unit adjusts focus distance across the entire scanning region and scans fingerprints at a distance ranges between 10 cm to 1 cm for a scanning time of less than 0.5 seconds.

3. The fingerprint reading method as recited in claim 1, wherein in the image capture unit captures 3 to 10 fingerprint images via the liquid lens unit.

4. The fingerprint reading method as recited in claim 1, further comprising the steps of determining properties of the object before initiating the illumination unit.

5. The fingerprint reading method as recited in claim 4, wherein in the step of determining properties of the object, further comprising:
   determining whether a fingerprint has the accurate shape, color, and pre-captured occupied area by a finger.

6. The fingerprint reading method as recited in claim 1, wherein the liquid lens unit adjusts focus distance across the entire scanning region and scans fingerprints at a distance ranges between 5 cm to 2 cm for a scanning time of less than 0.3 seconds.

* * * * *